Sept. 20, 1966　　　　F. HOFFMANN　　　　3,273,719
RACK FOR TOWELS, PAPERS, FILMS, AND THE LIKE
Filed June 24, 1964　　　　　　　　　　5 Sheets-Sheet 1

Inventor:
Fritz Hoffmann

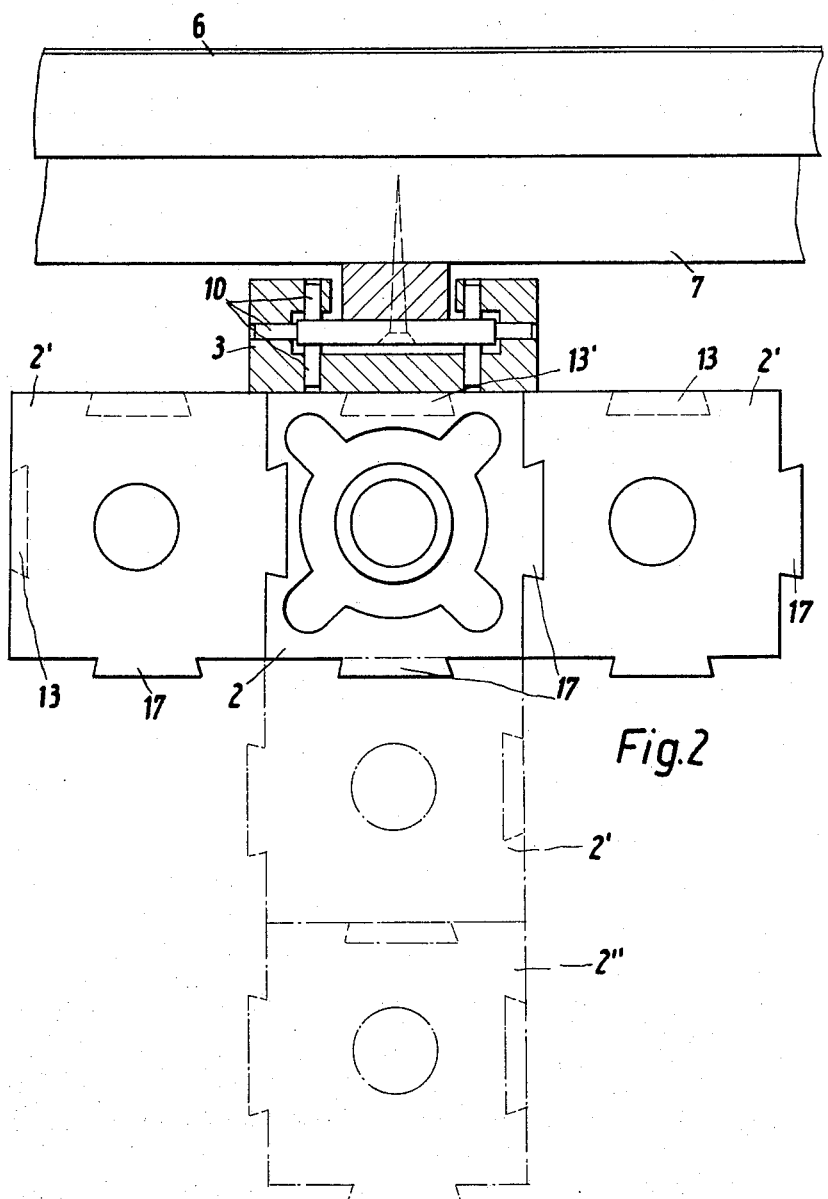

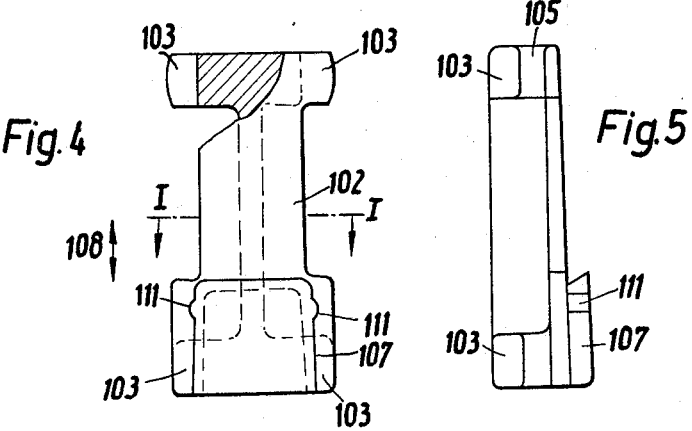
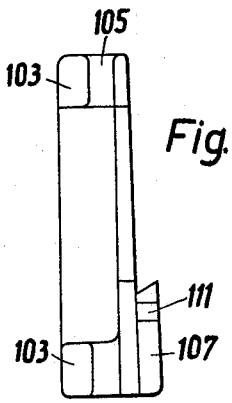
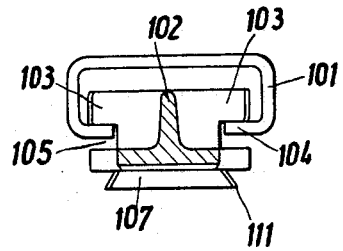
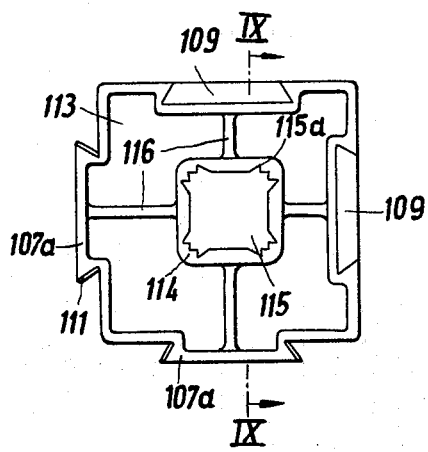

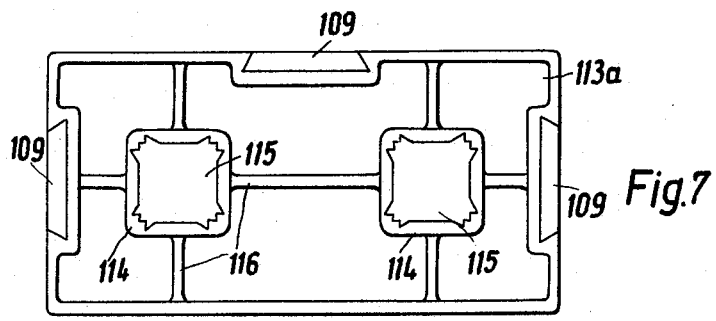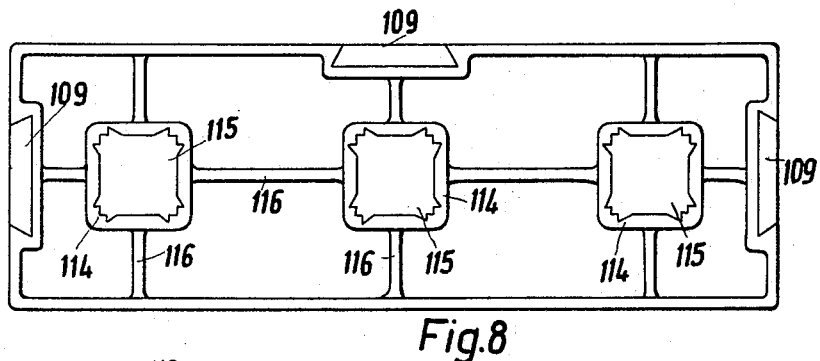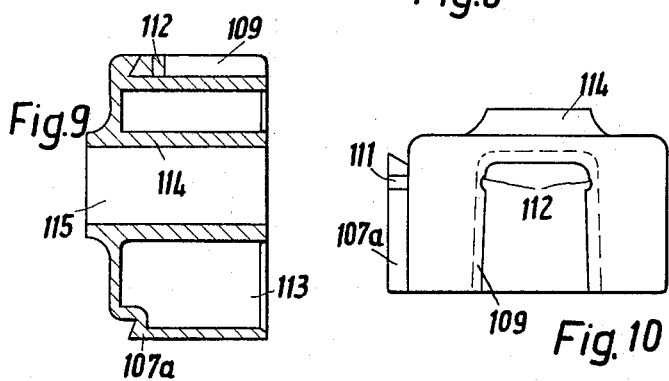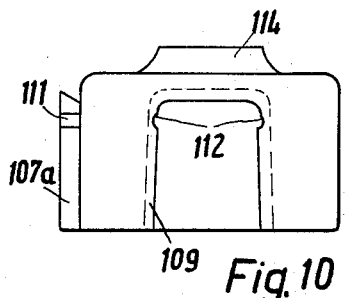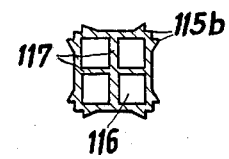

United States Patent Office 3,273,719
Patented Sept. 20, 1966

3,273,719
RACK FOR TOWELS, PAPERS, FILMS,
AND THE LIKE
Fritz Hoffmann, Steinenbronn, near Stuttgart, Germany, assignor to Robert Krause KG Zweigniederlassung Weilheim-Teck, Weilheim an der Teck, Germany
Filed June 24, 1964, Ser. No. 377,667
Claims priority, application Germany, June 26, 1963, H 49,549; June 20, 1964, K 53,266
19 Claims. (Cl. 211—94)

The present invention concerns a rack for supporting, drying, or keeping towels, papers, films, or the like. Heretofore known racks of the type involved consist of tubular members telescopically displaceable within each other so that they may be arranged for instance on the inside of a cupboard, closet, or the like, and may be pulled apart to the desired length.

Furthermore, racks have been known which consist of a U-shaped bar which is guided in a stationary elongated sleeve. Racks with tubular members displaceable one within the other have the drawback that when being pulled apart they represent a lever arm increasing in length the guiding of which becomes the poorer the farther the rack is pulled out. As a result thereof, the bars or tubes, when in fully pulled out condition, can easily break off or the support therefor may be torn off. The arrangement employing a U-shaped bar is unstable in view of its lateral tiltability.

It is, therefore, an object of the present invention to provide a rack for towels, papers, films, or the like, which will overcome the above mentioned drawbacks.

It is another object of this invention to provide a rack of the type set forth in the preceding paragraph which independently of the length to which it is pulled out will retain a uniform guiding stability.

It is another object of this invention to provide a rack as set forth above, which will be inexpensive to manufacture and which will make it possible without any changes in its construction to mount more or less supporting bars.

It is still another object of this invention to provide a rack of the type involved in which the supporting bars can easily be connected to the respective supports and will assure a thorough drying of towels placed thereover.

These and other objects and advantages of the invention will appear more clearly from the following specification in connection with the accompanying drawings, in which:

FIG. 2 is a side view and partial section taken along the line II—II of FIG. 1.

FIG. 3 illustrates partly in end view and partly in section a modified slide shoe for holding a supporting bar according to the present invention.

FIG. 4 is a bottom view of FIG. 3.

FIG. 5 is an end view seen from the left-hand side of FIG. 4.

FIGS. 6 to 8 respectively represent end views of supporting members for one, two and three supporting bars.

FIG. 9 is a section taken along line IX—IX of FIG. 6.

FIG. 10 is a top view of the arrangement of FIG. 6.

FIG. 11 is a cross section through a supporting bar for use in connection with the arrangement of FIGS. 6, 7 and 8.

The rack according to the present invention is characterized primarily in that it comprises at least one horizontal displaceable bar which is positively connected with a slide shoe which latter is displaceable on an approximately horizontal rail.

The thus supported and guided supporting bar or bars will have their free ends always spaced by the same distance from their respective supports regardless of the extent to which they have been pulled out so that the supporting bars will also in fully pulled-out condition have the same moment of resistance as in fully pushed-in condition. Advantageously, the supporting bar is positively connected to a slide shoe, preferably by means of a dovetail connection. In view of such dovetail connection, the individual parts of the supporting arrangement may be produced individually and inexpensively and may then merely be assembled.

Figure 1:
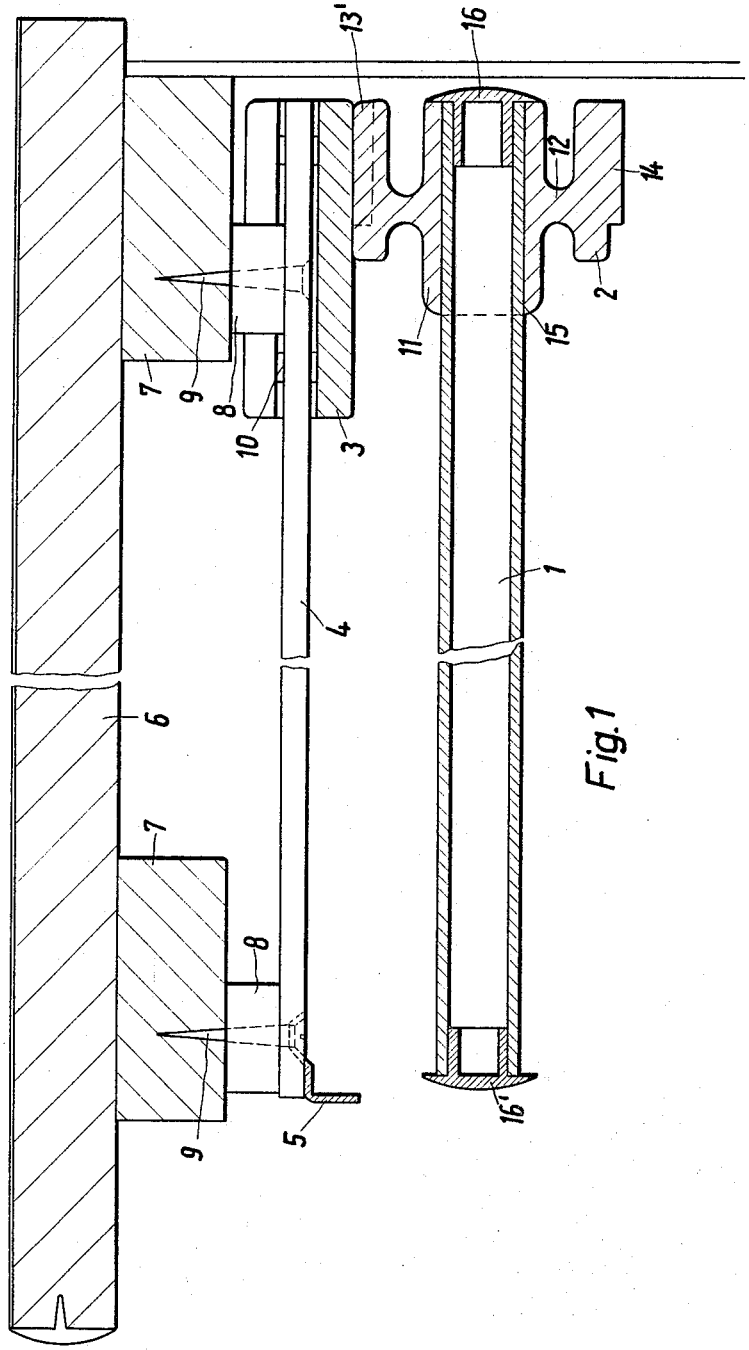
FIG. 1 is a longitudinal section through a rack according to the present invention.
Figure 2A:
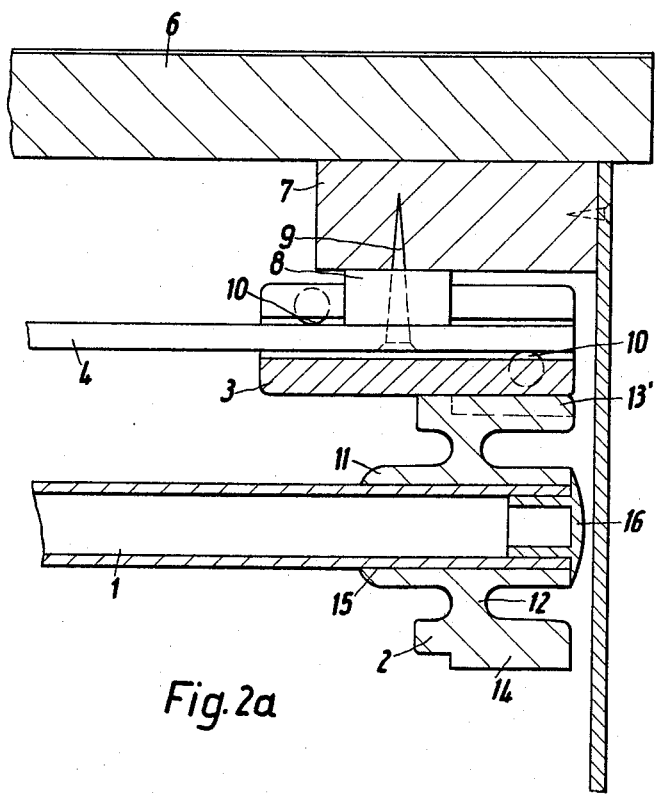
FIG. 2a illustrates in section an arrangement similar to that of FIG. 1 but differing therefrom in that the slide shoe which supports the bar and by means of rollers is movable on a supporting rail, has rollers near one end face above and near the other end face below the supporting rail.

As will be evident from FIGS. 1 and 2, the rack consists primarily of a horizontally arranged bar 1 which by means of a bar support or bar carrier 2 is connected to a slide shoe 3 which in its turn is displaceably arranged on a likewise horizontal supporting rail 4. As shown in FIG. 2, supporting rail 4 consists of flat material of rectangular cross section and is by means of screws 9 and spacer members 8 connected to transverse members 7 forming part or mounted on a plate or board 6 which may form a part of a cupboard, closet, or the like. Supporting rail 4 is embraced by slide shoe 3 so that the latter is suspended on rail 4 while leaving a passage for the spacer members 8. Those surfaces of slide shoe 3 which face supporting rail 4 have arranged thereon antifriction bodies in the form of rollers 10 which may be provided on both sides, on one side only, or diagonally. These rollers will assure a quiet and easy movement of slide shoe 3 on supporting rail 4.

The bar carrier 2 is provided with a hub 11 surrounded by a coaxially arranged square-shaped flange 14 which is connected to hub 11 by means of an annular rib 12. Hub 11 has a bore 15 therethrough for receiving bar 1. Bar 1 may be secured in said bore 15 to the bar carrier 2 in any convenient manner, for instance by means of a connecting cap 16 which is pressed into hollow bar 1 so as to hold the latter non-displaceably connected to carrier 2. The other free end of bar 1 is closed by a similarly designed cap 16'.

As will be evident from the drawings, the bar carrier 2 is suspended on slide shoe 3 and is connected thereto by means of a dovetail connection 13' so that the carrier 2 can easily be mounted on the carrier shoe 3.

While bar 1 has been designed as a tube, it may, of course, have any other desired cross section. In such an instance, it is merely necessary to provide hub 11 with a correspondingly contoured bore 15. In order to prevent slide shoe 3 when moving the same and thereby bar 1 outwardly toward the left with regard to FIG. 1 from leaving supporting rail 4, the latter has its respective end provided with an abutment 5. This abutment 5 is formed of a bent sheet metal member which is connected to supporting rail 4 by means of a screw 9. Slide shoe 3 carrying the supporting arm or bar 1 cannot accidentally be slipped off the rail.

As has been shown in FIG. 2, the flange member 14 of the bar carrier 2 is square-shaped and has each two oppositely located sides provided with a dovetail recess 13' and a dovetail protrusion 17. These recesses and protrusions may be engaged by corresponding protrusions and recesses forming part of additional bar carriers 2' and 2" which in their turn may likewise be provided with additional corresponding protrusions and recesses for receiving still further bar carriers. This has been clearly indicated in FIG. 2 by full lines and by dot-dash lines. Such an arrangement makes it possible to connect further bar carriers to the respective side surfaces of the bar carrier connected to slide shoe 3 so that the particular requirements and space may be taken advantage of. However, it is to be understood that the connection of the individual additional bar carriers is not limited to dovetail arrangements but may also be effected by studs, threads, bayonet joints, or other positive connections.

While FIGS. 1 and 2 show the supporting rail 4 substantially parallel to and longitudinally extending in the same direction as supporting bar 4, it is, of course, also possible to arrange the supporting rail 4 transverse to or at a certain angle with regard to bar 1. Advantageously, supporting bar 4 is by means of spacer members suspended on a ceiling so that the bars are arranged below the slide shoe. This suspended arrangement permits a clamping-free movement of the slide shoe on the supporting rail and furthermore said shoes will be outside the range of the towels, papers, or the like, hanging over bar 1.

If it is desired that the individual bars are located one above the other instead of one alongside the other as indicated in FIG. 2 in solid lines, it is merely necessary to mount the additional supporting bar carriers 2″ in the manner indicated in dot-dash lines in FIG. 2.

According to a modified slide shoe arrangement illustrated in FIG. 3, the slide shoe 102 is arranged in a supporting rail 101 of a substantially C-shaped profile. Slide shoe 102 has laterally protruding arms 103 supported by flanges 104 of supporting rail 101. These flanges 104 form a sliding path for the arms 103 and thereby for shoe 102. As will be evident from FIGS. 3, 4 and 5, slide shoe 102 has within the range of its front and rear ends two oppositely located pairs of slide arms 103, each of which is formed by grooves 105 at the side surfaces of shoe 102. The width of groove 105 is somewhat greater than the thickness of the flanges 104 of rail 101, which flanges engage groove 105 as shown in FIG. 3.

That bottom side of shoe 102 which faces away from supporting rail 101 is provided with a dovetail 107 extending in the direction of displacement of the shoe 102 as indicated by the arrow 108. Dovetail 107 may enter corresponding dovetail-shaped recesses 109 of corresponding bar carriers, as for instance the bar carriers 2 of FIG. 2. In the direction of insertion of the bar carriers into slide shoe 102, the dovetail 107 thereof and the dovetail recess 107 of the bar carrier are so designed as to slightly conically diverge. Within the range of the narrowest width of the dovetail 107 of shoe 102, the latter is provided with laterally protruding cam areas 111 having associated therewith corresponding cam openings 112 in the dovetail recesses 109 (FIG. 9). Such an arrangement will assure a locking of the slide shoe with regard to the bar carrier so that an undesired detachment of these two elements will be prevented. It will be appreciated that such a construction assures a safe guiding of the slide shoe connected to the bars. The slide shoes and rails may be produced in a very inexpensive manner, for instance of synthetic material, such as poly-vinyl chloride. The supporting rail of C-shaped cross section may be produced by an extrusion process and the rails may be cut to the desired size, i.e. length.

In many instances it has proved advantageous to provide the bar carriers with two or more openings for insertion of the supporting bars so that depending on the specific requirement one slide shoe of a single bar carrier may have connected thereto two or more supporting bars. Advantageously, the insertion openings and the bars are provided with corresponding length profiles which preferably are of a square-shaped cross section with prongs or teeth in the corners of the bar receiving openings. Such an arrangement will assure that the towels or the like placed over the bars will have a linear contact only with the bar so that practically the total inner and outer surface of the towel will be aired and will be quickly dried. Furthermore, the said profiling of the bars and the insert openings will assure a firm connection of the bars in the openings and will prevent any rotation of the bars therein.

An arrangement of this type is shown for instance in FIGS. 6 to 11. With reference to FIGS. 6, 9 and 10, the bar carrier 113 illustrated therein represents a cup-shaped member of synthetic material. The central portion of said bar carrier 113 has an eye 114 with a profiled insert opening 115. The outer surfaces of carrier 113 which form a right angle with regard to each other are provided with dovetail-shaped recesses 109 while the respective oppositely located sides are provided with two dovetail-shaped protrusions 107a. The outer walls of carrier 113 are strengthened with regard to the central eye 114 by ribs 116. It will be appreciated that further bar carriers with dovetailed-shaped recesses 109 may be connected to the dovetailed-shaped protrusions 107a. Cup-shaped members of the type shown in FIG. 6 have a high stability and are relatively light so that they can be produced rather inexpensively.

The bar carrier 113a illustrated in FIG. 7 is provided with two eyes 114 with parallel insert openings 115. According to this embodiment of a bar carrier of the invention, the outer surfaces are provided with three dovetail-shaped recesses 109 only.

The embodient according to FIG. 8 of a bar carrier according to the invention has three eyes 114 with insert openings 115. Also this bar carrier has its outer walls provided with three dovetail-shaped recesses 109 for receiving a corresponding dovetail of a slide shoe or of further bar carriers.

As will be evident from FIGS. 6 to 8, the insert openings 115 have a substantially square-shaped cross section with three protruding prongs or teeth. The bar illustrated in FIG. 11 corresponds to such a cross section and is adapted to be inserted into the opening 15 of a bar carrier 113, 113a while simultaneously being secured against rotation by prongs 115b and corresponding recesses. It will be obvious, as mentioned above, that a towel hanging over a bar of the contour of FIG. 11 is practically aired on its entire inside and outside. The bar 116 may likewise have a hollow profile and may be made of synthetic material. The hollow profile may be stiffened by ribs 117 crossing each other.

It is, of course, to be understood that the present invention is, by no means, limited to the particular constructions shown in the drawings but also comprises any modifications within the scope of the appended claims.

What I claim is:

1. A rack arrangement for supporting foldable sheet material, especially towels, films and papers, which includes: substantially horizontal rail means, shoe means displaceably mounted on said rail means, carrier means positively connected to said shoe means, and substantially horizontal supporting bar means connected to and carried by said carrier means, said carrier means having a rectangular cross section transverse to the longitudinal extension of the supporting bar means connected thereto, and having two adjacent sides of said cross section provided with dovetail-shaped protrusions while the remaining two adjacent sides of said cross section are provided with dovetail-shaped recesses.

2. An arrangement according to claim 1, in which said carrier means has a square cross section transverse to the longitudinal extension of the supporting bar means connected thereto.

3. A rack arrangement for supporting foldable sheet material, especially towels, films and papers, which includes: a substantially horizontal rail, shoe means displaceably mounted on said rail, first bar carrier means connected to said shoe means for movement therewith, additional bar carrier means connected to said first bar carrier means, and bar means respectively supported by and connected to said bar carrier means.

4. A rack arrangement for supporting foldable sheet material, especially towels, films and papers, which includes: substantially horizontal rail means, shoe means displaceably mounted on said rail means, carrier means connected to said shoe means for movement therewith, said carrier means having a hub with a bore therein and having flange means of a substantially square contour and also being provided with rib means interconnecting said flange means and said hub, and substantially horizontal supporting bar means engaging said bore and being connected to said carrier means.

5. A rack arrangement for supporting foldable sheet material, especially towels, films and papers, which includes: substantially horizontal rail means, shoe means displaceably mounted on said rail means, carrier means connected to said shoe means for movement therewith, said carrier means being provided with a bore, substantially horizontal tubular means open at both ends and having one end portion arranged in said bore, and connecting cap means respectively closing both ends of said bar means, one of said cap means which is adjacent said carrier means firmly connecting said tubular means to said carrier means.

6. A rack arrangement for supporting foldable sheet material, especially towels, films and papers, which includes: substantially horizontal rail means having a substantially C-shaped cross section with the inwardly extending arms of said rail means, the ends of which face each other, spaced from the connecting portion of said rail means, which interconnects said arms, said connecting portion being located in a substantially horizontal plane, shoe means having outwardly extending flange sections arranged between said horizontal interconnecting portion of said rail means and said inwardly extending arms while movably resting on the latter, and substantially horizontal supporting bar means connected to said shoe means so as to be displaceable together therewith.

7. An arrangement according to claim 6, in which said shoe means has a pair of flange sections arranged at each of its end portions.

8. A rack arrangement for supporting foldable sheet material, especially towels, films and papers, which includes: substantially horizontal rail means having a substantially C-shaped cross section with the inwardly extending arms of said rail means, the ends of which face each other, spaced from the connecting portion of said rail means, which interconnects said arms, said connecting portion being located in a substantially horizontal plane, shoe means having outwardly extending flange sections arranged between said horizontal interconnecting portion of said rail means and said inwardly extending arms while movably resting on the latter, that side of said shoe means which faces away from said rail means being provided with connecting means, carrier means engaged by said connecting means for connection with said shoe means so as to be displaceable therewith, and substantially horizontal supporting bar means carried by said carrier means for movement therewith.

9. An arrangement according to claim 8, in which one of the two members, namely, said shoe means and said carrier means is provided with a dovetail-shaped projection while the other one of said two members is provided with a dovetail-shaped recess receiving and connected to said dovetail-shaped projection for connecting said carrier means to said shoe means.

10. An arrangement according to claim 9, in which said dovetail-shaped projection and said dovetail-shaped recess diverge in the direction in which they are inserted into each other.

11. A rack arrangement for supporting foldable sheet material, especially towels, films, and papers, which includes: substantially horizontal rail means, a shoe member displaceably mounted on said rail means in longitudinal direction of the latter, a carrier member arranged below said shoe member, one of said members having a dovetail-shaped protrusion and the other one of said members having a corresponding shaped recess for receiving said protrusion and connecting said carrier member to said shoe member, said dovetail-shaped protrusion and said dovetail-shaped recess diverging in the direction in which said protrusion is insertable into said recess, said protrusion in the range of the smallest width thereof being provided with laterally protruding cam means, and said recess being provided with corresponding depressions for receiving said protruding cam means, and substantially horizontal supporting bar means supported by and connected to said carrier member.

12. A rack arrangement for supporting foldable sheet material, especially towels, films, and papers, which includes: substantially horizontal rail means, shoe means mounted on said rail means so as to be displaceable thereon in the longitudinal direction of said rail means, carrier means connected to said shoe means for movement therewith, said carrier means having at least two bores with the axes thereof extending in a substantially horizontal plane, and substantially horizontal supporting bar means extending into said bores and being connected to said carrier means.

13. An arrangement according to claim 12, in which said bores and said supporting bar means are provided with profiled contours for interengagement of said bar means and the walls of said bores.

14. An arrangement according to claim 12, in which said bores and said bar means have a substantially square cross section and have the corner portions thereof provided with grooves and protrusions for interengagement with each other.

15. A rack arrangement for supporting foldable sheet material, especially towels, films, and papers, which includes: substantially horizontal rail means, shoe means displaceably mounted on said rail means, carrier means positively connected to said shoe means, and substantially horizontal supporting bar means connected to and carried by said carrier means, said carrier means being cup-shaped and comprising opening means for receiving said bar means and having at least one of its outer surfaces provided with a dovetail-shaped protrusion and having at least another outer surface provided with a dovetail-shaped recess.

16. A rack arrangement for supporting foldable sheet material, especially towels, films and papers, which includes: a substantially horizontally extending rail member adapted to be fixedly connected to a stationary support, a shoe member supported by said rail member and movable thereon in the longitudinal direction thereof, a bar supporting member suspended on said shoe member and provided with a bore therethrough extending substantially in the same direction as and parallel to said rail member, and a supporting bar having one end portion thereof mounted in said bore for receiving and supporting foldable sheet material, said bar supporting member having outer surface means provided with coupling means for selectively and detachably receiving and supporting at least one additional supporting member of the same type as said bar supporting member.

17. A rack arrangement for supporting foldable sheet material, especially towels, films and papers, which includes: a substantially horizontally extending rail member adapted to be fixedly connected to a stationary support, a shoe member supported by said rail member and movable thereon in the longitudinal direction thereof, a bar supporting member suspended on said shoe member and provided with a bore therethrough extending substantially in the same direction as and parallel to said rail member, and a supporting bar having one end portion thereof mounted in said bore for receiving and supporting foldable sheet material, said bar supporting member having two pairs of substantially parallel oppositely located connecting surfaces for selective connection with a connecting surface of said shoe member and with a connecting surface of a similar bar supporting member, one of said last mentioned two members having its respective connecting surface provided with a dove-tailed recess and the other one of said two members having its respective connecting surface provided with a dove-tailed protrusion to fit into said dove-tailed recess.

18. A rack arrangement for supporting foldable sheet material, especially towels, films and papers, which includes: a substantially horizontally extending rail member adapted to be fixedly connected to a stationary support, a shoe member supported by said rail member and movable thereon in the longitudinal direction thereof, a first bar supporting member suspended on said shoe member, at least a second bar supporting member detachably connected to said first bar supporting member, said supporting members having interengaging coupling means for detachably interconnecting said supporting members, and each of said supporting members also having a bore therethrough extending substantially parallel to each other and in the longitudinal direction of said rail member, and supporting bars respectively having one end thereof located in said bores.

19. A rack arrangement according to claim 16, in which said supporting bar has a square shaped cross section with serrated surfaces in the corners of said square shaped cross section.

References Cited by the Examiner

UNITED STATES PATENTS

| | | | |
|---|---|---|---|
| 915,340 | 3/1909 | Freeman | 211—94 |
| 1,130,324 | 3/1915 | Owen | 46—16 |
| 2,072,685 | 3/1937 | Richter | 211—94 |
| 2,683,891 | 7/1954 | Rosenbaum | 16—87.4 |
| 2,812,067 | 11/1957 | Gussack | 211—46 |
| 2,893,676 | 7/1959 | Connors | 248—225 |
| 2,985,311 | 5/1961 | Abel | 211—94 |
| 3,116,837 | 1/1964 | Kelly | 211—94 |

CLAUDE A. LE ROY, *Primary Examiner.*

W. D. LOULAN, *Assistant Examiner.*